(12) United States Patent
Xue et al.

(10) Patent No.: US 10,781,683 B2
(45) Date of Patent: Sep. 22, 2020

(54) OPTIMIZING SENSOR SELECTION AND OPERATION FOR WELL MONITORING AND CONTROL

(71) Applicant: Halliburton Energy Services, Inc., Houston, TX (US)

(72) Inventors: Yuzhen Xue, Humble, TX (US); Jason D. Dykstra, Spring, TX (US); Xiaoqing Ge, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 392 days.

(21) Appl. No.: 15/546,843

(22) PCT Filed: Mar. 6, 2015

(86) PCT No.: PCT/US2015/019198
§ 371 (c)(1),
(2) Date: Jul. 27, 2017

(87) PCT Pub. No.: WO2016/144292
PCT Pub. Date: Sep. 15, 2016

(65) Prior Publication Data
US 2018/0023381 A1 Jan. 25, 2018

(51) Int. Cl.
*G06F 11/30* (2006.01)
*E21B 47/00* (2012.01)
(Continued)

(52) U.S. Cl.
CPC .......... *E21B 47/00* (2013.01); *E21B 41/0092* (2013.01); *E21B 44/00* (2013.01); *G05B 13/041* (2013.01); *E21B 47/06* (2013.01)

(58) Field of Classification Search
CPC ...................................................... E21B 47/00
See application file for complete search history.

(56) References Cited

U.S. PATENT DOCUMENTS

| 5,812,068 A | 9/1998 | Wisler et al. |
| 7,054,750 B2 | 5/2006 | Rodney et al. |
| (Continued) | | |

FOREIGN PATENT DOCUMENTS

| EP | 1193366 A2 | 4/2002 |
| WO | 2004/113676 A2 | 12/2004 |
| WO | 2014/022705 A1 | 2/2014 |

OTHER PUBLICATIONS

Fossgaard et al., "Method for Optimal Placement of Sensors in a Wired Pipe Drillstring", 2007 IADC/SPE Managed Pressure Drilling and Underbalanced Operations Conference and Exhibition, Mar. 28-29, 2007 (Year: 2007).*

(Continued)

*Primary Examiner* — Phuong Huynh
(74) *Attorney, Agent, or Firm* — Jason Sedano; Baker Botts L.L.P.

(57) ABSTRACT

In some aspects, the present disclosure includes systems and methods for optimizing one or more of a number of sensors on a drillstring or the locations of the sensors on the drillstring, or the types of the sensors. The method includes determining a number of sensors to place on a drillstring, a location for each of the sensors based, and types of sensors based, at least in part, on one or more of a state reduction technique and an optimization framework. The method includes disposing the selected number of sensors along the drilling and performing a drilling operation.

30 Claims, 7 Drawing Sheets

(51) Int. Cl.
  *E21B 44/00* (2006.01)
  *E21B 41/00* (2006.01)
  *G05B 13/04* (2006.01)
  *E21B 47/06* (2012.01)

(56) References Cited

U.S. PATENT DOCUMENTS

| | | | |
|---|---|---|---|
| 7,730,967 B2 | 6/2010 | Ballantyne et al. | |
| 2004/0010374 A1* | 1/2004 | Raghuraman | E21B 47/00 702/13 |
| 2005/0267686 A1* | 12/2005 | Ward | E21B 43/127 702/6 |
| 2005/0285751 A1 | 12/2005 | Hall et al. | |
| 2006/0272859 A1* | 12/2006 | Pastusek | E21B 21/08 175/40 |
| 2009/0294174 A1* | 12/2009 | Harmer | E21B 47/06 175/45 |
| 2010/0262370 A1 | 10/2010 | Bittar et al. | |
| 2011/0144960 A1* | 6/2011 | Weng | E21B 44/00 703/2 |
| 2011/0315445 A1* | 12/2011 | Runia | E21B 10/62 175/50 |
| 2013/0218499 A1 | 8/2013 | Lemer et al. | |
| 2013/0308424 A1* | 11/2013 | Kumar | E21B 47/14 367/82 |
| 2014/0029382 A1 | 1/2014 | Donderici et al. | |
| 2014/0077964 A1 | 3/2014 | Beligere et al. | |
| 2015/0015413 A1* | 1/2015 | Gao | E21B 47/16 340/854.4 |

OTHER PUBLICATIONS

International Preliminary Report on Patentability issued in related PCT Application No. PCT/US2015/019198 dated Sep. 12, 2017, 7 pages.
International Search Report and Written Opinion issued in related PCT Application No. PCT/US2015/019198 dated Dec. 15, 2015, 9 pages.
Kawaguchi, Kyojiro, et al. "Optimal Sensor Placement for Multi-Phase Flow Rate Estimation Using Pressure and Temperature Measurements." SPE Digital Energy Conference. Society of Petroleum Engineers, 2013.
Fossgaard, Eirik, Gerhard Haukenes Nygaard, and Erlend Heggelund Vefring. "Method for optimal placement of sensors in a wired pipe drillstring." IADC/SPE Managed Pressure Drilling & Underbalanced Operations. Society of Petroleum Engineers, 2007.
Office Action issued in related Canadian patent application No. 2,971,712, dated Mar. 29, 2019, 4 pages.

* cited by examiner

OPTIMIZING SENSOR SELECTION AND OPERATION FOR WELL MONITORING AND CONTROL

CROSS-REFERENCE TO RELATED APPLICATION

The present application is a U.S. National Stage Application of International Application No. PCT/US2015/019198 filed Mar. 6, 2015, which is incorporated herein by reference in its entirety for all purposes.

TECHNICAL FIELD

The present disclosure relates generally to well drilling and hydrocarbon recovery operations and, more particularly, to a system and method of optimizing the selection and operation of sensors for a wellbore drilling operation.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, such as drilling a subterranean formation, it is often desirable to perform sensor measurements using sensors along the drillstring or at the surface. The results of the sensor measurements may be indicative of the drillstring, the drilling process, or the subsurface formation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
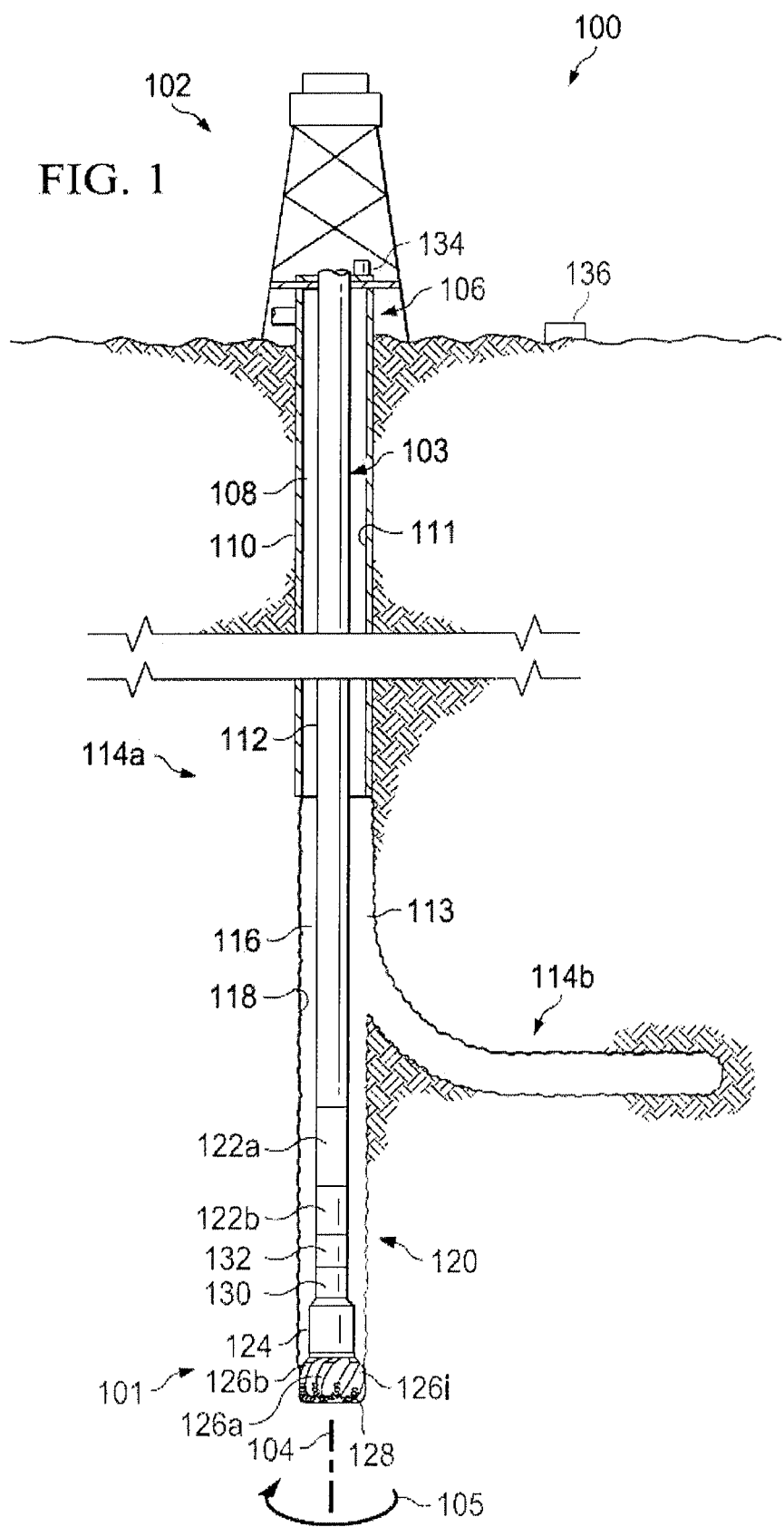
FIG. 1 illustrates an elevation view of an example embodiment of a drilling system used in an illustrative wellbore drilling environment, in accordance with some embodiments of the present disclosure.
Figure 2:
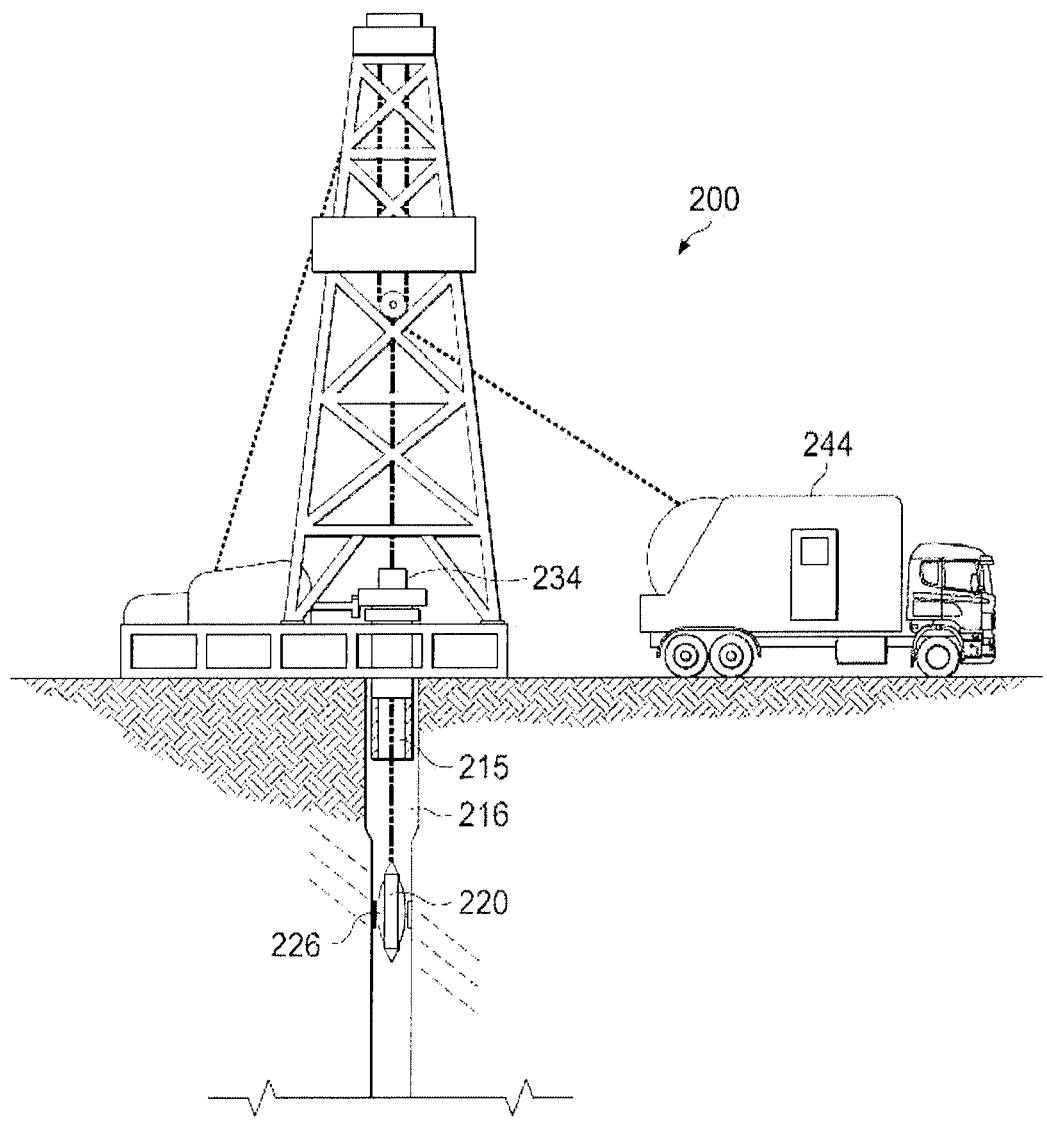
FIG. 2 illustrates an elevation view of an example embodiment of a downhole system used in an illustrative logging environment with the drillstring removed, in accordance with some embodiments of the present disclosure.

The present disclosure describes a system and method to optimize the number, placement, and operation of sensors on a drillstring. The sensors are located on or along a drillstring, as shown in FIG. 1, or on a wireline, as shown in FIG. 2. The sensors may include sensors to measure flow rate, pressure, or density of mud entering the wellbore. In other implementations, the sensors may include one or more measurement-while-drilling (MWD) tool sensors, such as strain gauges, accelerometers, and acoustic sensors. Embodiments of the present disclosure and its advantages are best understood by referring to FIGS. 1 through 8, where like numbers are used to indicate like and corresponding parts.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and the logging tool may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drillstring 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drillstring 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drillstring 103 to attached drill bit 101. The drilling fluids may be directed to flow from drillstring 103 to respective nozzles passing through rotary drill bit 101. The drilling fluid may be circulated back to well surface 106 through annulus 108 defined in part by outside diameter 112 of drillstring 103 and inside diameter 118 of wellbore 114. Inside diameter 118 may be referred to as the "sidewall" of wellbore 114. Annulus 108 may also be defined by outside diameter 112 of drillstring 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drillstring 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drillstring 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drillstring 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130.

MWD tool 130 may be integrated into drilling system 100 at any point along the drillstring 103. Multiple MWD tools 130 may be located along the length of the drillstring. MWD tool 130 may include one or more sensors. The sensors may include one or more measurement-while-drilling (MWD) tool sensors, such as strain gauges, accelerometers, and acoustic sensors. Other example sensors include one or more sensors to measure formation properties, such as acoustic, neutron, gamma ray, density, photoelectric, nuclear magnetic resonance, induction, resistivity, caliper, coring, or seismic sensors. Still other example sensors include one or more sensors to measure fluid properties, such as one or more of fluid flow rate or density. Each of the sensors produces an output indicative of the property measured by the sensor. MWD tool 130 may further include processor to operate the one or more sensor and to receive the outputs from the sensors.

Telemetry sub 132 may be included on drillstring 103 to transfer measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drillstring. Drilling system 100 may also include facilities (not expressly shown) that include computing equipment configured to collect, process, and/or store the measurements received from sensors on logging tool 130, and/or surface receiver 136, or from sensors at other locations along the drillstring. The facilities may be located onsite at the wellbore or offsite at a location away from the wellbore.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

At various times during the drilling process, drillstring 103 may be removed from wellbore 114 and a wellbore logging tool may be used to obtain information about the subterranean formation. FIG. 2 illustrates an elevation view of an example embodiment of drilling system 200 used in an illustrative logging environment with the drillstring removed, in accordance with some embodiments of the present disclosure. Subterranean operations may be conducted using wireline system 220 once the drillstring has been removed, though, at times, some or all of the drillstring may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm. In certain embodiments, a control system, an algorithm, or a set of machine-readable instructions may cause control unit 234 to generate and provide an input signal to one or more elements of drillstring 103, such as the sensors along the drillstring 103. The input signal may cause the sensors to be active or to output signals indicative of sensed properties. Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. In certain example embodiments, control unit 234, which may be located in logging tool 226, may perform one or more functions of the computing facility. An example of a computing facility is described with more detail with reference to FIG. 3.

Figure 3:
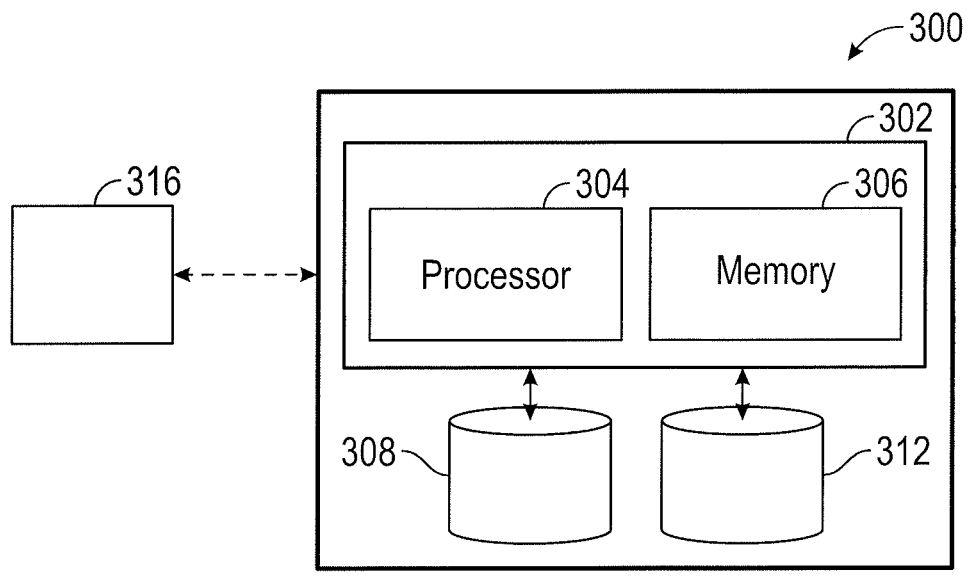
FIG. 3 illustrates a block diagram of an exemplary sensors control system, in accordance with some embodiments of the present disclosure.

FIG. 3 illustrates a block diagram of an exemplary control unit 300 in accordance with some embodiments of the present disclosure. In certain example embodiments, control unit 300 may be configured to determine the number, location, and types of sensors to be disposed on drillstring 103, for example as described in FIG. 4. In other example embodiments, control unit 300 may be configured to control the operation of one or more sensors along drillstring 103 during a drilling operation or another downhole operation. In some embodiments, control unit 300 may include sensor control system 302. Sensor control system 302 may be used to perform the steps of method 400 as described with respect to FIG. 4. Sensor control system 302 may include any suitable components. For example, in some embodiments, sensor control system 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include model database 312. Model database 312 may be communicatively coupled to sensor control system 302 and may provide models of the drillstring, borehole, subsurface formation, or other properties of interest. Model database 312 may be implemented in any suitable manner, such as by functions, instructions, logic, or code, and may be stored in, for example, a relational database, file, application programming interface, library, shared library, record, data structure, service, software-as-service, or any other suitable mechanism. Model database 312 may include code for controlling its operation such as functions, instructions, or logic. Model database 312 may specify any suitable properties of the drillstring, borehole, or subsurface formation that may be used to determine the number, placement, or operation of sensors along the drillstring 103. Although control unit 300 is illustrated as including two databases, control unit 300 may contain any suitable number of databases.

In some embodiments, sensor control system 302 may be configured to generate signals to enable or disable sensors at specified times. In some embodiments, sensor control system 302 may be further configured to cause one or more sensors to transmit sensor output to a remote processor, while controlling other sensors to not transmit sensor output to the remote processor. In certain example embodiments, sensor control system 302 may be configured to make such a determination based on one or more instances of prior well database 308, and/or one or more instances of model database 312. Values from prior well database 308, and/or model database 312 may be stored in memory 306. Sensor control system 302 may be further configured to cause processor 304 to execute program instructions operable Control unit 300 may be communicatively coupled to one or more displays 316 such that information processed by sensor control system 302 may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

With the continued development of the sensing hardware, a greater number of sensors are suitable for the use at the surface and at downhole sensing systems. In certain implementations, installation and maintenance of downhole sensors takes more effort than installation and maintenance of sensors located at or near the surface. Furthermore, the number of downhole sensors may be limited by the amount of bandwidth available between the sensors and a surface processor. Moreover, the limitation of communication bandwidth prevents the real-time data transmission. In certain example embodiments the number of downhole sensors, location of the downhole sensors, and the types of downhole sensors may be optimized to minimize the number of sensors. In certain example embodiments the number of downhole sensors, location of the downhole sensors, and the types of downhole sensors may be optimized to decrease the communications load between downhole sensors and a surface processor. In certain example embodiments, the optimization is performed before the drillstring 103 is constructed. In certain example embodiments the BHA 120 can be constructed of many parts and different numbers and types of sensors. In certain embodiments, this methodology can be used to balance the cost and the ability to represent the performance downhole, helping build a continuous surveying capability with a confidence in the output before it is placed downhole. Also, redundancy can be created in an optimal way such that diagnostics can be performed with confidence by placing the redundant sensors in the optimal positions. Furthermore, from the real-time data, the proposed strategies can select the most "important" quality (e.g. certain parameters) to observe and send, resulting in maximal drilling monitoring and information convey capability.

Figure 4:
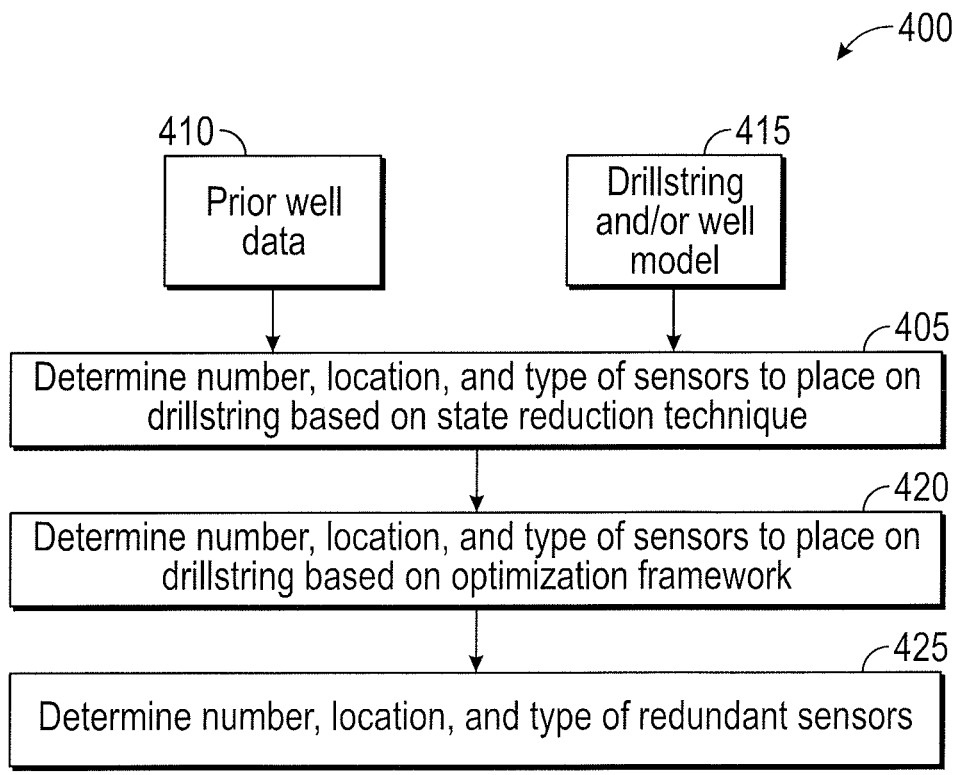
FIG. 4 illustrates a flow chart of example methods for sensor placement in accordance with some embodiments of the present disclosure.

FIG. 4 is an example flow chart of exemplary methods for determining a number and location of sensors along a drillstring, shown generally at 400. Many sensors can be installed to monitor drilling process, from surface to downhole. For example, one or more sensors may be installed on a drill rig to monitor the flow rate, pressure and density of mud entering the wellbore. The measurements provide real-time mud status to a flow control unit or an operator who monitors the system and takes actions when failure happens. In certain example embodiments, MWD tools including one or more of strain gages, accelerometers, and acoustic sensors are then installed downhole to measure the drilling string dynamics. In certain embodiments, sensors are installed at drillstring locations in pairs or larger groups. For example, in certain embodiments, pairs of strain gauges and accelerometers are placed at one or more locations along the drillstring.

In block 405, the system determines one or more of a number, location, and type of sensors to place on the drillstring based on a state reduction technique. In certain example embodiments, the state reduction may be performed without prior knowledge of the system. In other example embodiments, the state reduction may be based, at least in part, on prior well data 410. For example, sensor measurements from one or more wells in the same field may be used as part of the state reduction process. In other example embodiments, the state reduction process may be based, at least in part, on models of drillstring and/or the well 415. In certain embodiments, the state reduction techniques determine which sensors' data are most valuable to estimate the overall system information. In block 420, the system determines one or more of a number, location, and type of sensors to place on the drillstring based on an optimization framework. In certain example embodiments, the optimization framework may be based, at least in part, on prior well data 410. For example, sensor measurements from one or more wells in the same field may be used as part of the optimization framework. In other example embodiments, the optimization framework may be based, at least in part, on models of drillstring and/or the well 415. In block 425, the system determines the location and number of redundant sensors to place on the drillstring. In certain example embodiments, the number and location of redundant sensors is based, at least in part, on one or both of the prior well data 410 and models of drillstring and/or the well 415.

Modifications, additions, or omissions may be made the method of FIG. 4 without departing from the scope of the present disclosure. For example, the order of the steps may be performed in a different manner than that described and some steps may be performed at the same time. Additionally, each individual step may include additional steps without departing from the scope of the present disclosure. In certain embodiments, one or more steps of FIG. 4 may be omitted.

Figure 5:
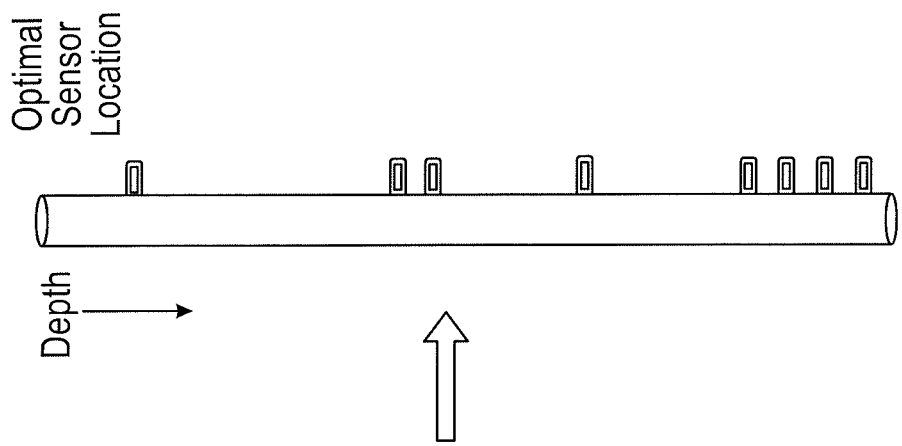
FIG. 5 is an example diagram of a drillstring locations for sensors placement.
Figure 5:
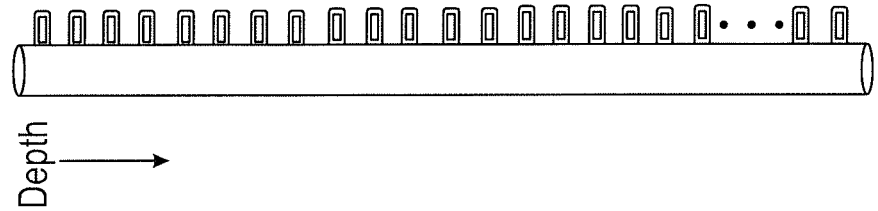

FIG. 5 shows an example drillstring. The left-hand side of FIG. 5 illustrates all of the locations where sensors may be located. The right-hand side of FIG. 5 shows a drillstring with sensors placed at optimal or sub-optimal locations. In certain example embodiments, the number and placement of the sensors along the drillstring are determined by the processes of one or more of blocks 410, 420, or 425, as discussed herein. Compared to sensing the whole span of well, the new strategies collect data from a considerably reduced number of sensors, as shown in FIG. 5. In certain example embodiments, one or more of blocks 410, 420, and 425 are performed before a job is initiated. In other example embodiments, one or more of blocks 410, 420, and 425 are performed, at least in part, during a drilling operation to adaptively optimize the sensing and communication based on changing operating condition. As discussed above one or more of blocks 410, 420, and 425 may be based, at least in part, on prior well data 410. In certain embodiments, wells in one field may have similar drilling characteristics. Therefore the number, type, and locations of sensors for one well may also be used for sensor placement of other wells.

Returning to block 405, example state reduction techniques are discussed in greater detail below. In certain example embodiments, a large number of sensors can potentially be distributed along the well path. In such an implementation, if the system records all measurements over a long enough time span, then the covariance of the recorded data forms a high-dimensional space. In such an implementation, state reduction approaches can be applied on the covariance matrix to extract the most important components of the system. The extracted states correspond to the chosen sensor locations, which may be optimal or suboptimal locations. In certain embodiments, there is a tradeoff between the dimension of the subspace and the accuracy of estimation. Careful selection of the extracted components, however, may provide high accuracy with a low-order approximation. In certain example embodiments, the state reduction technique of block 405 may be used to reveal a simplified structure or pattern from a complex data set. In certain example embodiments, by selecting the most dominant components from a large set of basis, the high-dimensional data can be re-expressed by an accurate low-order approximation.

Example state reduction techniques of block 405 include principal component analysis (PCA), independent component analysis (ICA), and local feature analysis (LFA). In other implementations, other state reduction techniques are used. In certain example embodiments, PCA state reduction may be performed without a priori knowledge of the system. In other example embodiments, ICA state reduction is applied to associate the sensing data with the physical variables. In such an implementation, the sensed data is then more cleared tied to a physical meaning. Such an implementation may facilitate monitoring the quality of interested physical variables as well as performing the fault detection. In certain example embodiments, LFA state reduction is used to generate a low-dimensional representation that is sparsely distributed and spatially localized. Such an implementation may yield a more clear description of each mode's local features and position.

Figure 6:
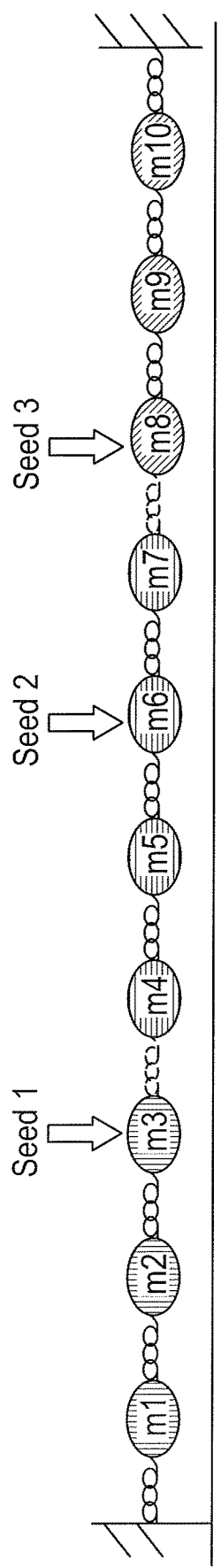
FIG. 6 is a diagram of an example spring-mass system for optimization by example systems of the present disclosure.
Figure 7:
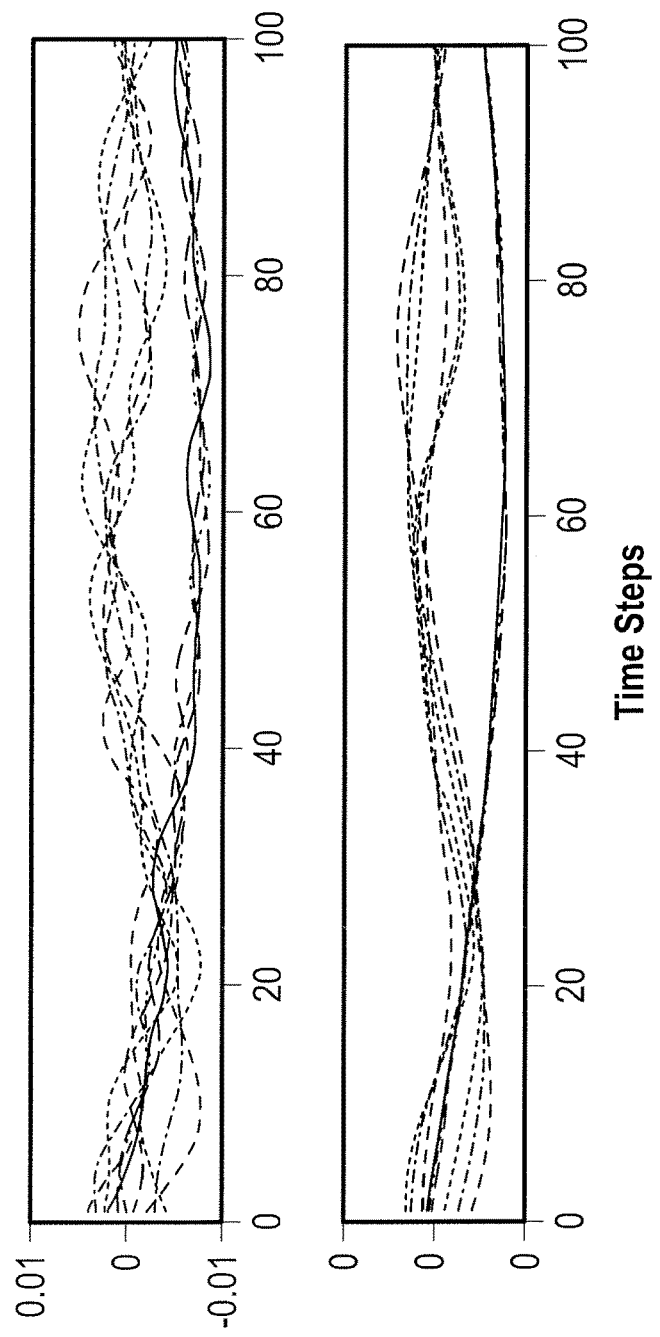
FIG. 7 is a set of graphs of measurements of force versus time for an a full spring mass system of FIG. 6 and a state reduced sensing of the spring mass system of FIG. 6.

FIG. 6 shows an example ten-mass-spring system to illustrate the LFA method. Ten masses in the system are connected by eleven springs. The spring constants up to m3 are 500 N/m, the spring constants between m4 and m7 are 600 N/m, the spring constants after m8 are 700 N/m, the spring constants between m3 and m4, between m7 and m8 are both 10 N/m. The mass spring system starts with initial dynamics condition so that all the masses are activated. From the construction and the existence of two small spring constants, the 10 masses are separated into three dynamics group: m1 to m3, m4 to m7, and m8 to m10. The dynamics of the 10-mass system was recorded for 100 time steps then fed into the LFA algorithm. In certain example embodiments, LFA identifies m1 to m3, m4 to m7, and m8 to 10 as three dynamics groups. Such an indemnification of three dynamics groups matches the physical property of the system. Moreover, an example LFA analysis selects masses m3, m6 and m8 to represent each group and then derives the dynamics relationship between the selected three masses and all 10 masses. The whole system's dynamics (10 masses) are then reconstructed based on the dynamics of the three masses. FIG. 7 shows a comparison between the full system's true dynamics (upper) and reconstructed dynamics from the dynamics of only masses m3, m6 and m8 (lower). In both graphs, each curve represents the dynamics of one mass. It can be seen that the reconstructed dynamics retains the main features of the whole system's dynamics, with only limited details being compromised.

In certain example embodiments, the drillstring dynamics and BHA dynamics are modelled, at least in part, as a lumped mass-spring-damper system. The LFA algorithm used to solve the above problem is applied to reconstruct the drillstring and BHA dynamics. One example model has N masses connected by springs and dampers. An example LFA algorithm identifies the most n representative masses, each of which will be associated with one or more sensors. In one example embodiment, the set of sensors is a pair of one strain gauge and one accelerometer. In certain example embodiments, the n sets of strain gauges and accelerometers measure the position, velocity and acceleration of the associated mass to reconstruct the overall system dynamics. Because n is much less than N, a reduced set of strain gauge and certain example embodiments, this analysis reduces the real-time data processing burden and thus enables real-time well status analysis.

Returning to block 410, example optimization frameworks to determine the number, location, and type of sensors to place on a drillstring are discussed in greater detail below. As discussed above, some state reduction approaches of block 405 are data-based analysis methods. The state reduction techniques may be performed with or without knowledge of the system dynamics. The state reduction techniques, however, may be used to minimize the reconstruction error or statistical dependence between basis vectors. Due to various objectives, the system may optimize different cost functions in other example embodiments. Example cost functions may be used to minimize one or more of the number of sensors being used, total energy required, and total system cost. In certain example embodiments, the one or more of the number, type, and placement of sensors is determined using an optimization framework. The optimization objective can be any quantity of interest. The limitations of drilling environment and equipment are also taken into account as the constraints of the problem, e.g., sensor bandwidth, maximal available sensors, power usage limitation, formation changes, data storage and transmission capability. This type of method optimizes sensor location in a more realistic way, with versatile objective and constraints. The (sub)optimal solution of the problem could be obtained through classical linear and/or nonlinear searching algorithms.

In one example embodiment, the following optimization set of formulas is used to minimize the overall prediction error covariance, where the number of sensors is constrained.

$$\min E = \|\Sigma_{k=1}^{m} [z(k) - \tilde{z}(k)][z(k) - \tilde{z}(k)]^T\|  \quad \text{(Eq. 1)}$$

$$\text{such that } z(k) = f(y(k)) \quad \text{(Eq. 2)}$$

$$n \leq N_{total} \quad \text{(Eq. 3)}$$

Equation (2) provides example model that predicts drilling parameter $z(k)$ based on sets of sensor measurements $y(k)$ at time k. In one example embodiment, the sensor measurements include strain gauge and accelerometer sensor measurements. Although this example embodiment discusses sets of strain gauges and accelerometers, other example embodiments use additional or different sensors, as discussed above. Example sensor measurements $y(k)$ may include one or more of velocity, acceleration, and strain. Example drilling parameter $z(k)$ include one or more of rate of penetration (ROP), weight on bit (WOB), and torque on bit (TOB). The value "n" indicates how many sets of strain gauges and accelerometers are currently used for measuring. For example, $\dim(y(k))=n$, if only one measurement is used per set of strain gauge and accelerometer. The function $\tilde{z}(k)$ is the measured drilling parameter value so that equation (1) evaluates the overall prediction error based on n sets of strain gauge and accelerometer measurements at pre-defined locations. In certain example embodiments where the system goal is to use the smallest number of sensors, the system chooses n as the cost function and then imposes a constraint on the maximum acceptable prediction error.

In certain embodiments, optimization based sensor selection is a systematic and effective approach to evaluate the performance of each possible sensor placement. Due to time, material, and economic limitations, however, it is generally not possible to experimentally test the performance of all possible combinations for a drill string of any complexity. With the help of a dynamic model that predicts certain sensor output from available inputs, the system may simulate the sensor measurements of interest and run a searching algorithm for a solution. In one example embodiment, a dynamic model may have the following form:

$$x(k+1) = Ax(k) + Bu(k)$$

$$y(k) = Cx(k) \quad \text{(Eq. 4)}$$

where A, B, C are matrices that characterize the system dynamics, $x(k)$ is the internal state of the model, $u(k)$ is the input to the system, and $y(k)$ is the output that includes all sensor location candidates. In certain example embodiments, the model is low order such that the associated computational effort is low. In other example embodiments, the model may be higher order. The system may then evaluate the cost function for possible sensor combinations by changing the output matrix C. For example, suppose there are 1000 sensor location candidates, then C is a 1000×1 matrix. To simulate the performance of placing sensors at the 2nd, 100th and 350th locations, the system may make such a simulation by taking out the 2nd, 100th and 350th rows of C together with the first equation in Eq. 4 to simulate the sensor outputs of interest. This enables a computationally efficient way of searching for a solution, which may be characterized as a suboptimal solution or optimal solution. In certain embodiments, the modeled sensors are pairs of accelerometers and strain gauges.

Figure 8:
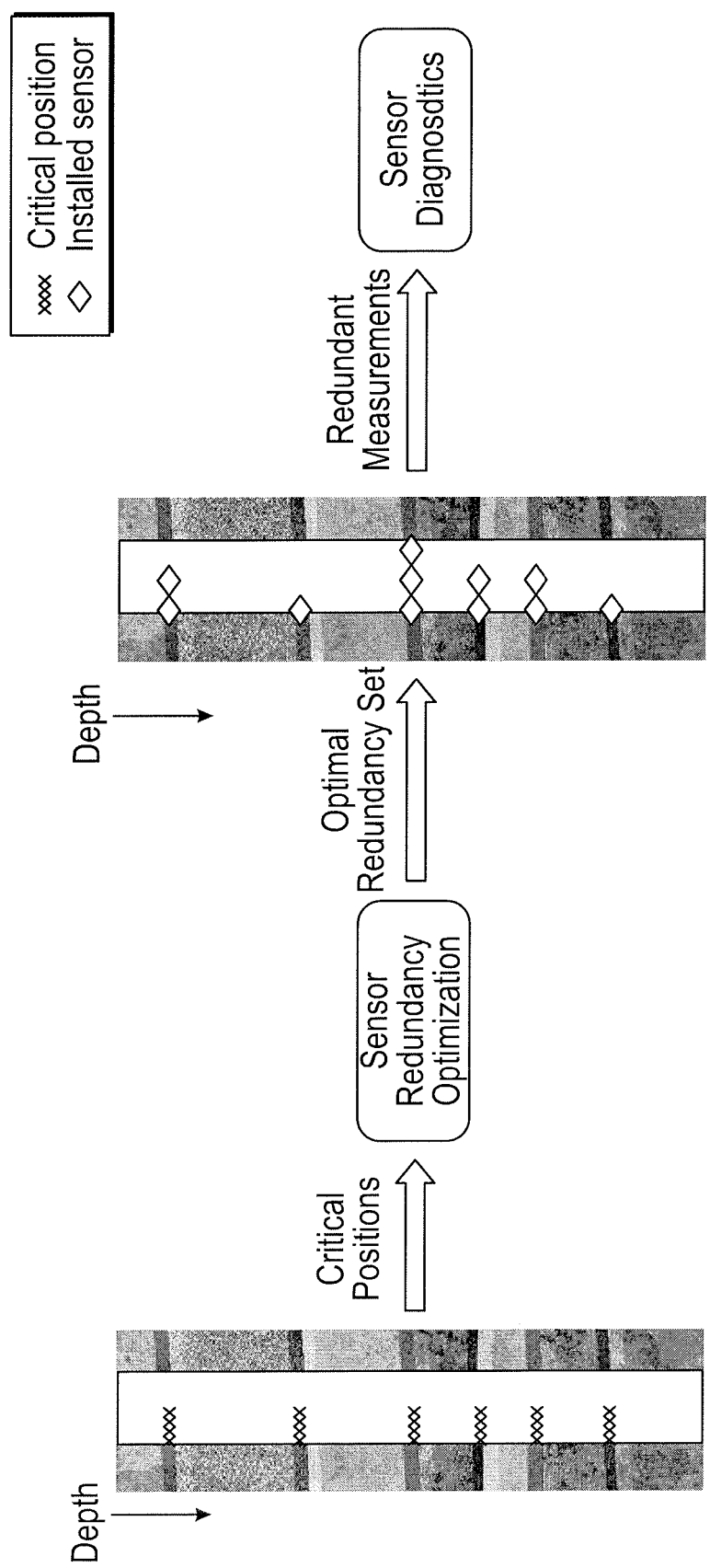
FIG. 8 is a diagram illustrating example placement of redundant sensors along a drillstring of the present disclosure.

Returning to block 425, the determination of the location and number of redundant sensors to on the drillstring will be discussed in greater detail. As shown in FIG. 8, the system determines which crucial positions along the drillstring require two or more redundant sensors.

In certain example embodiments, sub-groups of sensors may be physically coupled to other sensors along the drillstring, such that the system may transform information from one sub-system into data comparable to the output of other sub-systems. Analysis of the sensor groups that are physically coupled, may be used to identify sensor failure. If, however, there are bifurcations within the geometry, redundant sensors may be placed at these critical positions for sensor diagnostics. In certain example embodiments, sensor optimization techniques are used to determine the minimal number of sensors we need with N redundancies by including the critical positions in the optimization objectives. If one sensor fails, redundant sensors allow the system to continue to estimate the systems dynamics and monitor bifurcations. Example embodiments may use the optimization techniques of block 425 to determine the number of redundant sensors.

In certain example embodiments, the optimization techniques described above are performed as part of block 425. For example, the optimization techniques of block 425 may include the state reduction techniques discussed above. In other example embodiments, the optimization techniques of block 425 include the cost-function-based optimization frameworks discussed above. Other example embodiments of the the the optimization techniques of block 425 include one or more of linear programming, non-linear programming, stochastic programming, dynamic programming, genetic algorithms, and particle swarm analysis.

Other example sensor location optimization approaches identify one or more important parameter for measurement and then take further measurements based on the parameter. In one example embodiment, a flow meter, PWD (Pressure While Drilling) sensor, and a magnetometer are installed at or around the same location on a drill string to monitor the flow rate, pressure and drillstring rotational speed, respectively. In certain embodiments, the system may not need to record the outputs of all of these sensors simultaneously. Instead, the system may determine if a condition is present based on the outputs of a subset of the sensors. For example, the system may determine if stick-slip vibrations are present based on a subset of the sensors. The system may then determine that the rotational speed as important parameter to measure. Likewise, when mud flow shows abnormality, the system may then activate one or both of the flow meter and PWD sensor for flow status monitoring. In certain example embodiments, the system monitors force distribution along the drillstring during a directional drilling operation.

Figure 9:
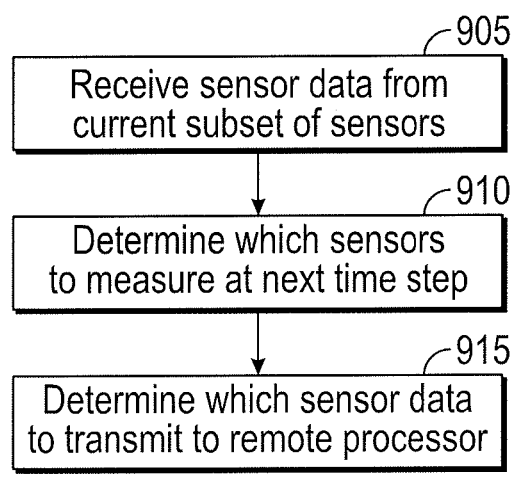
FIG. 9 illustrates a flow chart of example methods for sensor operation in accordance with some embodiments of the present disclosure.

FIG. 9 is a flow chart of an example method for online sensor optimization. In block 905, the system receives sensor outputs from a current subset of sensors. In general, the current subset of sensors was selected at a previous time, based, at least in part, on the sensor measurements at the previous time. In block, 910 the system determines which subset of sensors to take measurements from at the next time step. In block 915, the system determines which sensor data to transmit to a remote processing center.

During the drilling job or other downhole operation, the system may perform online re-optimization of sensors to determine which sensors will be used a future time, as shown at block 910. Because the drilling operation may be changing, the system may dynamically select sensors or dynamically select the monitored parameters based, at least in part, on the currently measured operating conditions. The selection of sensors and monitored parameters may also be based, at least in part, on well data or model of the drillstring or well. In certain example embodiments, when the well conditions remain consistent or change slowly, a small number of sparsely distributed measurements may be sufficient to reconstruct the drilling dynamics. In certain embodiments, however, when the current sensor measurements received in block 905 indicate a fault or a critical operation, the system may then cause the sensors to take additional measurements at or around the critical point as necessary for well monitoring, modeling and control purposes. In certain example embodiments, the system uses a real-time optimization framework based, at least in part, on evolving well environment properties measured at a current or past time. In one example embodiment, the drillstring has n sensors or sets of sensors along its length. Example sensor sets include a paired set of one accelerometer and one strain gauge. At each time step, the system determines m positions, which are a subset of the n total sensor locations along the drillstring. The m positions represent an optimal or a sub-optimal solution to an optimization technique, such as those discussed with respect to block 420 of FIG. 4. In certain example embodiments, the process of block 905 reduces the sensors activated at a time and further distributes sensing locations adaptively to changing operating condition. In certain example embodiments, the system uses results from the current or from one or more previous wells to determine sensor locations and types for one or more future wells. Certain example implementations may converge to a minimum number of optimal sensor selections. In other example implementations, the system may reestablish sensor locations after a plurality of wells.

Returning to block 915, the system determines which sensor measurement to transmit to a processor. Based on the number of sensors active currently or in the past, there may be a large amount of sensor data for transmission to a remote processor. In many cases, however, there is constrained bandwidth between the sensors and the remote processor. For example, the sensors and remote processor may communicate by mud pulse telemetry or other low-throughput transmission method. In certain example embodiments of the system, sensor data that have the largest effect on the system dynamics is selected for transmission to the remote processor. The selection of which sensor data to transmit may be based on an optimization framework, as discussed above with respect to block 420 in FIG. 4. In certain embodiments, sensor data is selected for measurement and transmission based on how well the sensor data represents the system dynamics. From the control point of view, the system then transmits the sensor data thathas the most significant effect the drillstring or the downhole operation. In certain example embodiments, if the system dynamics are described by an appropriate model, such as the model of Equation 4, above, the importance of data for control and observation is evaluated by the controllability and observability Gramians, respectively. In one example embodiment, the process of block 915 is performed by a smart communication module that is located, at least in part, downhole. The smart communication module determines which data collected in block 905 has the largest effect on the system and transmits the data that is determined to have the largest effect on the system. The only difference is that instead of sensing-related indices, we look at drilling efficiency, health of the system (e.g., drill bit wear), the potential for vibrations, etc. to evaluate the importance of the data to control.

The determination of which sensor measurements to transmit to the remote processor in block 915 may be based, at least in part, on whether the sensor measurements indicate a condition. For example, in one embodiment, in block 915 the system determines if there is a stick-slip condition. In one example embodiment, if there is stick slip then the system transmits one or more measurements that are critical for the detection of torsional vibration to a remote processor. The measurements include one or more sensor measurement that is indicative of one or more of BHA dynamics, WOB, and TOB. The remote processor may then use the measurements to take actions to mitigate the stick slip condition. If, however, the sensor measurements do not indicate a stick-slip or a vibration condition, the system transmits measurements for determining ROP to the remote processors. In certain example embodiments, the measurement indicative of ROP are used to measure drilling performance.

Although the present disclosure and its advantages have been described in detail, it should be understood that various changes, substitutions and alterations can be made herein without departing from the spirit and scope of the disclosure as defined by the following claims.

What is claimed is:

1. A method of optimizing one or more of a number of sensors on a drillstring, one or more locations of the sensors on the drillstring, and types of the sensors, the method comprising:
   determining a number of sensors to place on a drillstring, a location for each of the sensors, and which of the types of sensors to place on the drillstring based, at least in part, on one or more of:
      a state reduction technique applied to a covariance matrix associated with recorded data to extract one or more states, wherein the one or more states correspond to one or more locations on the drillstring; and
      an optimization framework, wherein the optimization framework comprises cost-function-based optimization;
   disposing the selected number of sensors along the drillstring at the one or more locations on the drillstring; and
   performing a drilling operation.

2. The method of claim 1, wherein the sensors include one or more strain gauges.

3. The method of claim 1, wherein the sensors include one or more accelerometers.

4. The method of claim 1, wherein the sensors include one or more acoustic sensors.

5. The method of claim 1, wherein the sensors include one or more flow meters.

6. The method of claim 1, wherein the sensors include one or more pressure-while-drilling sensors.

7. The method of claim 1, wherein the sensors include one or more magnetometer to measure a rate of rotation.

8. The method of claim 1, wherein the state reduction technique includes one or more of a principal component analysis, an independent component analysis, or a local feature analysis.

9. The method of claim 1, wherein the state reduction technique is based, at least in part, on data collected from a previously-drilled well.

10. The method of claim 1, wherein the state reduction technique is based, at least in part, on a model of the drill sting and the subsurface formation.

11. The method of claim 1, wherein the optimization framework is based, at least in part, on data collected from a previously-drilled well.

12. The method of claim 1, wherein the optimization framework is based, at least in part, on a model of one or more of the drillstring and the subsurface formation.

13. The method of claim 1, wherein the optimization framework is based, at least in part, on one or more of the following:
   a sensor bandwidth;
   a number of available sensors;
   costs of one or more sensors;
   power usage of one more sensor;
   one or more characteristics of the subsurface earth formation;
   data storage capabilities of one or more elements of the drillstring; and
   data transmission capabilities of one or more drillstring elements.

14. The method of claim 1, wherein the optimization framework is to increase the measurement accuracy of measuring one or more drilling parameters, wherein the drilling parameters include one or more of a rate of penetration, weight on bit, or torque on bit.

15. The method of claim 1, wherein the optimization framework is further to determine a number of redundant sensors and a location of the redundant sensors.

16. The method of claim 1, wherein the drillstring is equipped with a plurality of sensors, each sensor to produce an output, and wherein the optimization framework is further to select a subset of the sensor outputs for transmission or recording based, at least in part, on one or more of the sensor outputs that is indicative of a downhole condition.

17. A method of optimizing transmission or recording of data from a plurality of sensors on a drillstring, or one or more locations of the sensors on the drillstring, or types of the sensors on the drillstring, the method comprising:
   at a first time:
      measuring outputs from a first subset of sensors;
      determining which outputs from the first subset of sensors to transmit or record, based, at least in part, on which outputs are desired to monitor;
      determining a second subset of sensors to measure at a second time based, at least in part, on the outputs from the first set of sensors.; and
   wherein determining which outputs from the first subset of sensors to transmit or record is based, at least in part, on one or more of:
      a state reduction technique applied to a covariance matrix associated with outputs from the first subset of sensors to extract one or more states, wherein the one or more states correspond to one or more locations on the drillstring; and
      an optimization framework, wherein the optimization framework comprises cost-function-based optimization.

18. The method of claim 17, further comprising:
   at the second time:
      measuring outputs from the second subset of sensors;
      determining which outputs from the second subset of sensors to transmit or record, based, at least in part, on whether the outputs reflect an effect on the drillstring or the drilling operation; and
      determining a third subset of sensors to measure at a second time based, at least in part, on the outputs from the first set of sensors.

19. The method of claim 17, wherein the state reduction technique includes one or more of a principle component analysis, an independent component analysis, or a local feature analysis.

20. The method of claim 17, wherein determining which outputs from the first subset of sensors to transmit, based, at least in part, on an optimization framework, further comprises:
determining which outputs best represent system dynamics.

21. The method of claim 20, wherein determining which outputs best represent system dynamics, further comprises:
evaluating one or more of drilling efficiency, system health, and vibration potential to determine which outputs best represent system dynamic.

22. The method of claim 20, wherein the first subset of sensors are selected based, at least in part, on an optimization framework, and wherein the optimization framework is based, at least in part, on a model of one or more of the drill sting and the subsurface formation.

23. The method of any of claim 22, wherein the optimization framework is based, at least in part, on one or more of the following:
a sensor bandwidth;
a number of available sensors;
costs of one or more sensors;
power usage of one more sensor;
one or more characteristics of the subsurface earth formation;
data storage capabilities of one or more elements of the drillstring; and
data transmission capabilities of one or more drillstring elements.

24. A wellbore drilling system for drilling in a subsurface earth formation, comprising:
a drillstring;
a plurality of sensors disposed along the drillstring, each sensor to produce a sensor output; and
a sensor control system communicatively coupled to the sensors, the sensor control system including:
a processor; and
a memory communicatively coupled to the processor, the memory including non-transitory machine readable instruction, that, when executed, cause the processor to:
at a first time:
measure outputs from a first subset of sensors;
determine which outputs from the first subset of sensors to transmit or record, based, at least in part, on which outputs have an effect on the drillstring or the drilling operation; and
determine a second subset of sensors to measure at a second time based, at least in part, on the outputs from the first subset of sensors; and
wherein determining which outputs from the first subset of sensors to transmit or record is based, at least in part, on one or more of:
a state reduction technique applied to a covariance matrix associated with outputs from the first subset of sensors to extract one or more states, wherein the one or more states correspond to one or more locations on the drillstring; and
an optimization framework, wherein the optimization framework comprises cost-function-based optimization.

25. The wellbore drilling system of claim 24, wherein the non-transitory machine readable instruction, that, when executed, further cause the processor to:
at the second time:
measure outputs from the second subset of sensors;
determine which outputs from the second subset of sensors to transmit or record, based, at least in part, on whether the outputs reflect an effect on the drillstring or the drilling operation; and
determine a third subset of sensors to measure at a second time based, at least in part, on the outputs from the first set of sensors.

26. The system of claim 24, wherein the state reduction technique includes one or more of a principal component analysis, an independent component analysis, or a local feature analysis.

27. The system of claim 24, wherein the executable instructions that cause the processor to determine which outputs from the first subset of sensors to transmit, based, at least in part, on an optimization framework, further cause the processor to:
determine which outputs best represent system dynamics.

28. The system of claim 27, wherein the executable instructions that cause the processor to determine which outputs best represent system dynamics, further cause the processor to:
evaluate one or more of drilling efficiency, system health, and vibration potential to determine which outputs best represent system dynamic.

29. The system of claim 24, wherein the first subset of sensors are selected based, at least in part, on an optimization framework, and wherein the optimization framework is based, at least in part, on a model of one or more of the drill sting and the subsurface formation.

30. The system of claim 29, wherein the optimization framework is based, at least in part, on one or more of the following:
a sensor bandwidth;
a number of available sensors;
costs of one or more sensors;
power usage of one more sensor;
one or more characteristics of the subsurface earth formation;
data storage capabilities of one or more elements of the drillstring; and
data transmission capabilities of one or more drillstring elements.

* * * * *